United States Patent
Pawelzik et al.

(10) Patent No.: US 6,199,586 B1
(45) Date of Patent: Mar. 13, 2001

(54) SINGLE-CONTROL MIXING VALVE

(75) Inventors: Manfred Pawelzik, Soest; Max Derr, Iserlohn, both of (DE)

(73) Assignee: Friedrich Grohe AG & Co. KG, Hemer (DE)

( * ) Notice: Subject to any disclaimer, the term of this patent is extended or adjusted under 35 U.S.C. 154(b) by 0 days.

(21) Appl. No.: 09/492,551

(22) Filed: Jan. 27, 2000

(30) Foreign Application Priority Data

Feb. 5, 1999 (DE) .............................................. 199 04 705

(51) Int. Cl.$^7$ ...................................................... F16K 11/06
(52) U.S. Cl. .................. 137/625.17; 137/625.4; 137/636.3
(58) Field of Search ........................ 137/625.4, 625.41, 137/625.17, 636.3

(56) References Cited

U.S. PATENT DOCUMENTS

| | | | |
|---|---|---|---|
| 3,533,436 | * 10/1970 | Parkison | 137/636.6 X |
| 4,153,077 | 5/1979 | Egli . | |
| 4,327,758 | * 5/1982 | Uhlmann | 137/625.17 |
| 4,540,023 | 9/1985 | Pawelzik . | |
| 4,621,659 | * 11/1986 | Pawelzik | 137/625.17 |
| 4,672,999 | * 6/1987 | Knapp | 137/625.4 |
| 4,796,666 | * 1/1989 | Bergmann | 137/625.17 |
| 5,082,023 | * 1/1992 | D'Alayer de Costemore d'Arc | 137/636.3 |
| 5,613,521 | * 3/1997 | Knapp | 137/625.41 |
| 5,660,208 | * 8/1997 | Casas | 137/625.17 |

* cited by examiner

*Primary Examiner*—John Rivell
*Assistant Examiner*—Meredith H. Schoenfeld
(74) *Attorney, Agent, or Firm*—Herbert Dubno; Andrew Wilford

(57) ABSTRACT

A mixing valve has a housing, a fixed valve plate in the housing having a flat outer surface generally centered on and perpendicular to a main axis and formed offset from the main axis with a pair of angularly offset and axially throughgoing inlet ports, and a movable valve plate in the housing having an inner surface flatly engaging the outer surface of the fixed valve plate and an opposite outer surface. The movable valve plate is formed with a pair of angularly offset and axially throughgoing inlet ports alignable with the fixed-plate inlet ports. The ports of one of the pairs of inlet ports are at different radial spacings from a center of the respective plate. An actuating lever is displaceable in the housing about the main axis and about a transverse axis crossing the main axis for shifting the movable plate between a closed position with both of the movable-plate inlet ports out of alignment with the fixed-plate inlet ports and blocked by the fixed-plate outer face, a pair of end positions with one of the movable-plate inlet ports aligned with one of the fixed-plate inlet ports and the other of the movable-plate inlet ports out of alignment with the other of the fixed-plate inlet ports, and an intermediate position with each of the movable-plate inlet ports partially overlapping the respective fixed-plate inlet port.

19 Claims, 7 Drawing Sheets

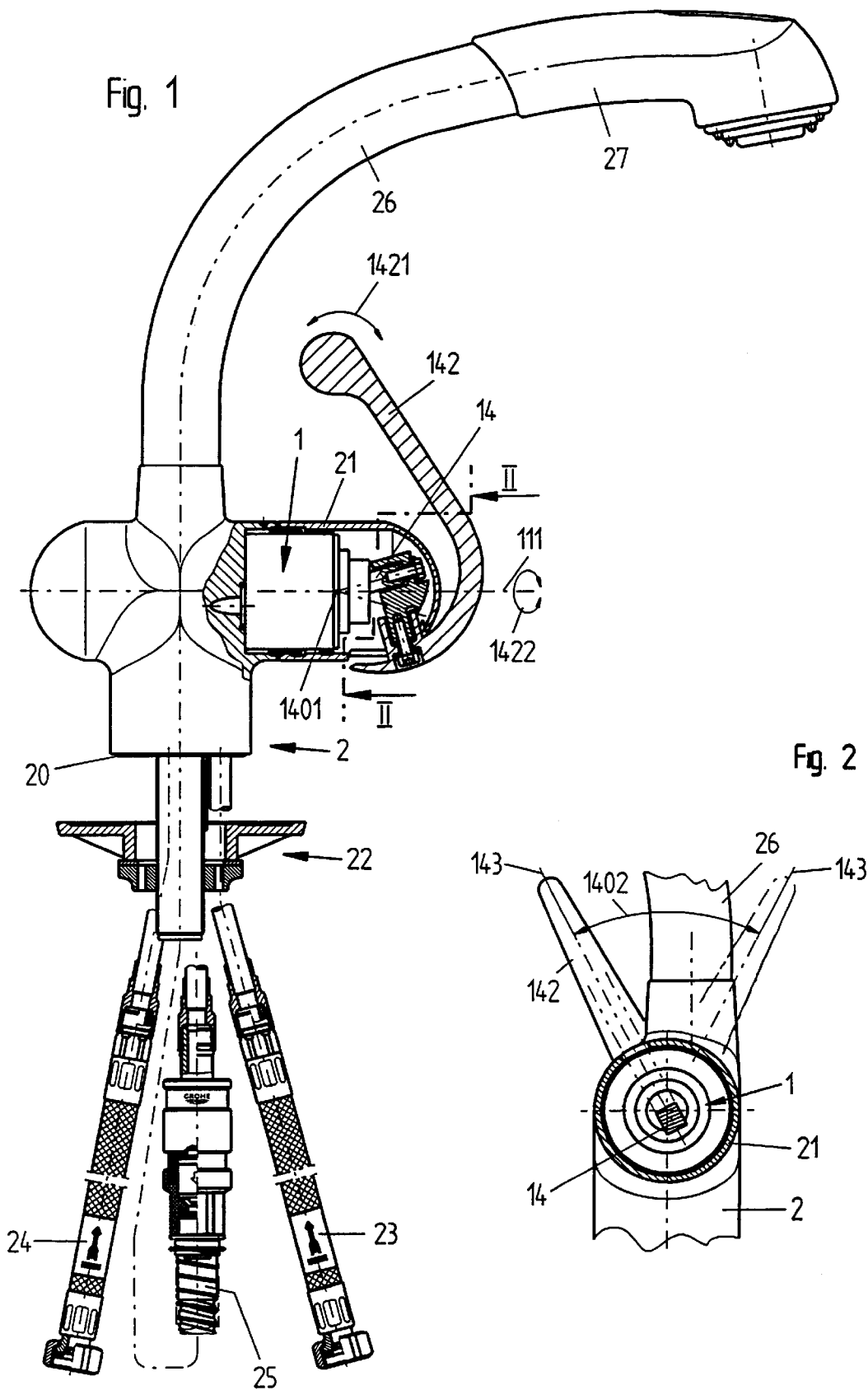

SINGLE-CONTROL MIXING VALVE

FIELD OF THE INVENTION

The present invention relates to a mixing valve. More particularly this invention concerns a single-control valve of the type installed in a faucet.

BACKGROUND OF THE INVENTION

A standard single-control mixing valve such as described in commonly owned U.S. Pat. No. 4,540,023 has a fixed valve plate formed with a pair of inlet ports respectively connected to hot- and cold-water inlet lines and, offset therefrom, an outlet port connected to an outlet line normally leading to a faucet. A movable valve plate sitting atop this fixed valve plate has a mixing cavity open toward the fixed plate and movable to variously overlap the ports. When the movable plate is pivoted about a normally upright axis perpendicular to the interface between the plates it can align more of one of the inlet ports with the mixing cavity and less of the other inlet port to vary the ratio of hot and cold water fed to the outlet port, and when slid in a front-to-back direction parallel to the plate interface it can control the overall extent of overlap to vary the overall flow from the inlet ports through the mixing cavity to the outlet port.

Typically the movable valve plate is pivoted on the bottom end of a lever that is centrally pivoted on a housing liner that is coupled to the movable plate to rotate it about the upright axis. The upper end of the lever is fitted to a handle that is raised and lowered to control volume rate of flow and that is pivoted from side to side to control outlet temperature. Thus the user controls output temperature by pivoting the handle connected to the movable plate about the axis perpendicular to the plates and output volume by rocking the handle, typically in a vertical plane, about another axis perpendicular to the plate axis.

U.S. Pat. No. 4,153,077 describes an alternate system where the lever is pivoted from side to side to control volume rate of flow and is tipped back and forth to control outlet temperature. This alternate system is preferred by some users in that it more closely mimics an older variety of faucet which is rotated to control volume.

OBJECTS OF THE INVENTION

It is therefore an object of the present invention to provide an improved single-control mixing valve.

Another object is the provision of such an improved single-control mixing valve which overcomes the above-given disadvantages, that is which can operate in accordance with the alternate system.

A further object is to provide a valve cartridge that can be installed in a conventional faucet for converting it to the alternate operational system.

SUMMARY OF THE INVENTION

A mixing valve has according to the invention a housing, a fixed valve plate in the housing having a flat outer surface generally centered on and perpendicular to a main axis and formed offset from the main axis with a pair of angularly offset and axially throughgoing inlet ports, and a movable valve plate in the housing having an inner surface flatly engaging the outer surface of the fixed valve plate and an opposite outer surface. The movable valve plate is formed with a pair of angularly offset and axially throughgoing inlet ports alignable with the fixed-plate inlet ports. The ports of one of the pairs of inlet ports are at different radial spacings from a center of the respective plate. An actuating lever is displaceable in the housing about the main axis and about a transverse axis crossing the main axis for shifting the movable plate between a closed position with both of the movable-plate inlet ports out of alignment with the fixed-plate inlet ports and blocked by the fixed-plate outer face, one end position with one of the movable-plate inlet ports aligned with one of the fixed-plate inlet ports and the other of the movable-plate inlet ports out of alignment with the other of the fixed-plate inlet ports, another end position with the other movable-plate inlet port aligned with the other fixed-plate inlet port and the one movable-plate inlet port out of alignment with the one fixed-plate inlet ports, and an intermediate position with each of the movable-plate inlet ports partially overlapping the respective fixed-plate inlet port.

This valve is therefore set up such that side-to-side rocking of the lever that rotates the movable plate about the main axis serves to control volume rate of flow while front-to-back pivoting of the lever that slides the movable plate on the fixed plate adjusts the flow temperature. The valve housing can be set up such that it has the same porting as a standard valve cartridge so that this system can be installed in a conventional faucet to give it the new operational style.

The mixing valve further has according to the invention structure forming at the movable-plate outer surface a fluid-flow passage into which open the movable-plate inlet ports. The plates are each formed with an outlet port so positioned that they overlap in the end and intermediate positions of the plates.

These outlet ports are at centers of the plates. They can be of circular shape and according to the invention the movable-plate outlet port is of a flow cross section equal to between 50% and 100% of the flow cross section of the fixed-plate outlet port, preferably about 80% of the fixed-plate outlet-port flow cross section.

The ports in accordance with the invention are formed as cylindrical-annulus segments and in one embodiment of the invention the ports of each plate lie within a quadrant of the respective plate. The ports of each plate are at substantially different radial spacings from centers of the respective plates.

The radial spacing of the ports of one of the plates is substantially greater than the radial spacing of the other of the plates.

The mixing valve wherein the ports of the one plate are spaced radially from each other by a distance equal to at least twice a radial dimension of one of the ports of the one plate and the ports of the other plate are spaced radially from each other by a distance equal to at least a radial dimension of one of the ports of the other plate. In this case the ports of each plate have, measured from a center of the respective plate, an angular dimension of at most 20°.

In another embodiment of the invention the ports of the other pair are at both at a same radial spacing from a center of the respective plate. The ports of the other pair both have, measured from a center of the respective plate, an angular dimension of about 60°. Furthermore one of the ports of the one pair has, measured from a center of the respective plate, an angular dimension of about 60° and the other of the ports of the one pair has an angular dimension of about 30°. The ports of the each pair are diametrally opposite each other.

In all cases all of the ports have substantially the same flow cross section. Thus, as the temperature is adjusted, flow volume remains constant. In addition the valve is formed with passages that supply water under pressure to the fixed-valve inlet ports and withdraw water from the movable-valve inlet ports at the movable-valve outer face.

BRIEF DESCRIPTION OF THE DRAWING

The above and other objects, features, and advantages will become more readily apparent from the following description, reference being made to the accompanying drawing in which:

FIG. 1 is a partly sectional side view of a faucet incorporating the valve according to the invention;

FIG. 2 is a section taken along line II—II of FIG. 1;

SPECIFIC DESCRIPTION

Figure 3:
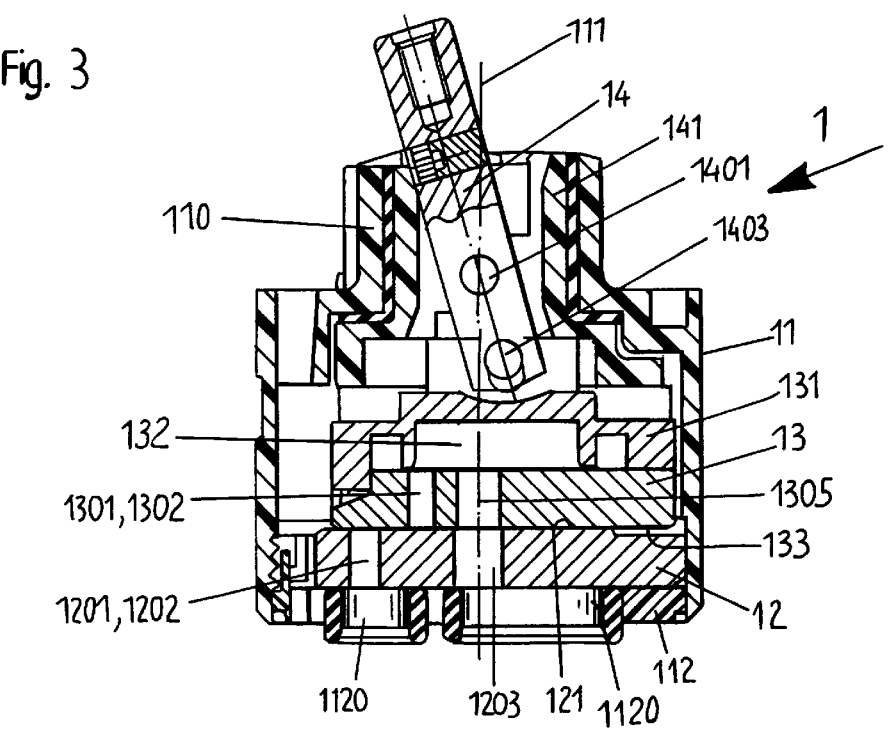
FIG. 3 is a larger-scale section through the valve in accordance with the invention.

As seen in FIGS. 1 and 2 a faucet according to the invention has a body 1 holding a valve 1 and adapted to be secured to an unillustrated deck by a nut 22. A faucet arm 26 extends upward from the body 2 and carries a removable spray head 27. Underneath the deck are intake lines or pipes 23 and 24 for cold and hot water, respectively, water and a hose 25 connected between the valve 1 and the faucet head 27.

The valve 1 is formed as a cartridge pressed against a vertical surface of the housing 1 in which open passages connected to the feed lines 23 and 24 and against which it is pressed as is standard in the art. As also shown in FIG. 3 the valve 1 has a generally cylindrical housing 11 centered on an axis 111 and provided with an end plate 112 provided with connections 1120 that communicate through appropriate passages in the body 2 with the lines 23 and 24 and hose 25. A ceramic valve disk or plate 12 fixed in the housing 11 sits atop the end plate 112 and has a planar face 121 on which slides a planar face 133 of a movable valve disk or plate 13. The orientation of the connections 1120 is identical to that of the standard valve of above-cited U.S. Pat. No. 4,540,023 where up and down movement of a control lever varies output temperature and side-to-side movement controls flow volume.

A mounting body 131 fixed to the movable valve disk 13 is pivoted at 1403 to a stem or lever 14 pivoted about a parallel axis 1401 in a housing part formed by a sleeve liner 1241 pivotal about the axis 11 in a stepped-in upper portion 110 of the housing 11. The axis 1401 is perpendicular to the axis 111. A handle 142 is fixed to the outer end of this stem 14 and normally extends generally vertically. Rocking or pivoting this lever 142 about the horizontal axis 111 as indicated by arrow 1422 so a lever centerline 143 moves through a 45° arc 1402 thus pivots the movable plate 13 about the axis 111 on the fixed plate 12. Rocking the lever 142 as indicated by arrow 1421 about the axis 1401 slides the disk 13 on the disk 12.

Figure 5:
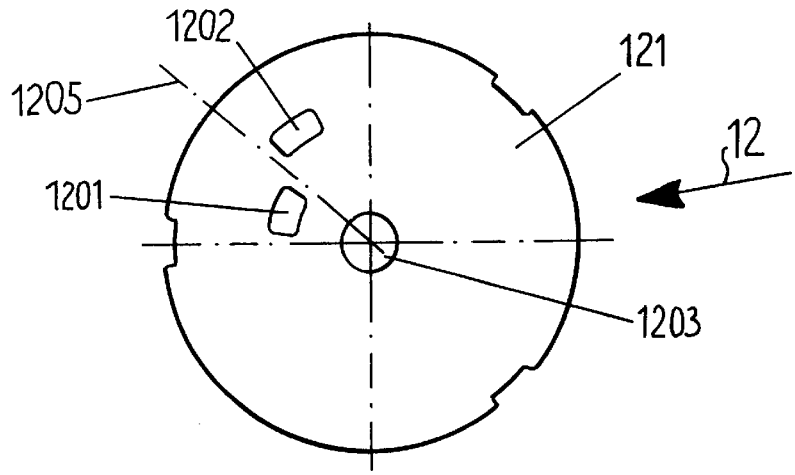

According to the invention as shown in FIG. 5 the fixed plate 12 is formed at its center, that is on the axis 111 with a large-diameter circular output port 1203 connected to the hose 25 and, radially offset therefrom, with input ports 1201 and 1202 connected to the cold- and hot-water lines 23 and 24, respectively. The ports 1201 and 1202 are formed as 20° segments of a cylindrical annulus, that is with concentric arcuate inner and outer edges and radial extending planar end edges. They are angularly offset from each other by about 4°, to each side of a radius 1205 and the cold-water input port 1201 is spaced radially inward of the hot-water input port 1202 by a distance equal at least to the radial dimension of the port 1201.

Figure 4:
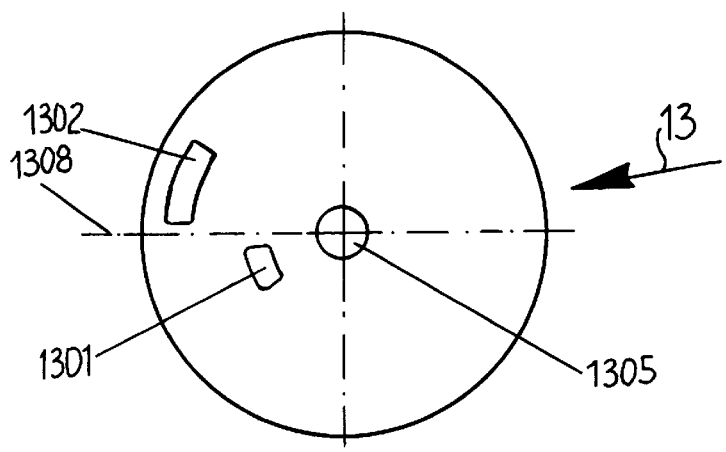
FIGS. 4 and 5 are detail views of the disks of the valve.

The movable disk 13 as shown in FIG. 4 has a circular center outlet port 1305 of a diameter equal to between 50% and 100%, here 80%, of the diameter of the port 1203. In addition it has two ports 1301 and 1302 shaped as 20° cylindrical-annulus segments and flanking by 2° a radial symmetry line 1308. The inner port 1301 is spaced identically from the center of the disk 13 as the port 1201 is from the center of the disk 12 but the outer port 1302 is spaced outward by a distance equal to twice the radial dimension of the port 1301. The body 131 fixed to the top face of the disk 13 has as shown in FIG. 3 a cavity 132 that allows fluid communication between the upper ends of the ports 1301, 1302, and 1305 at all times.

Figure 6:
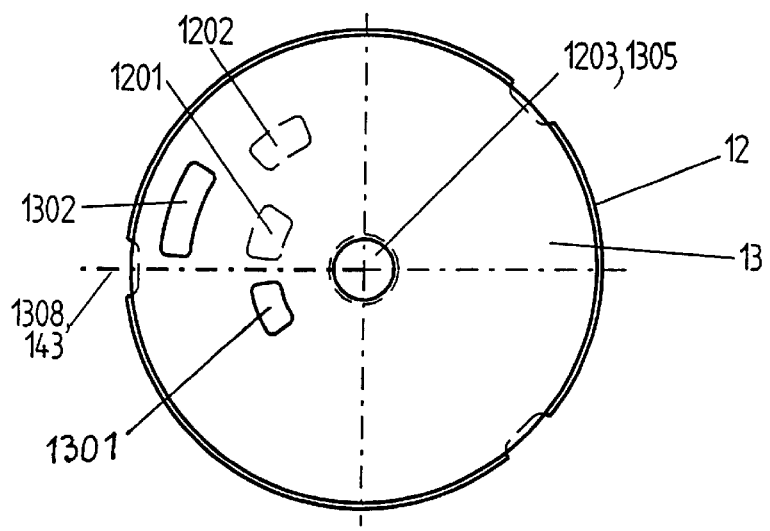
FIG. 6 shows the valve disks in the no-flow position.
Figure 7:
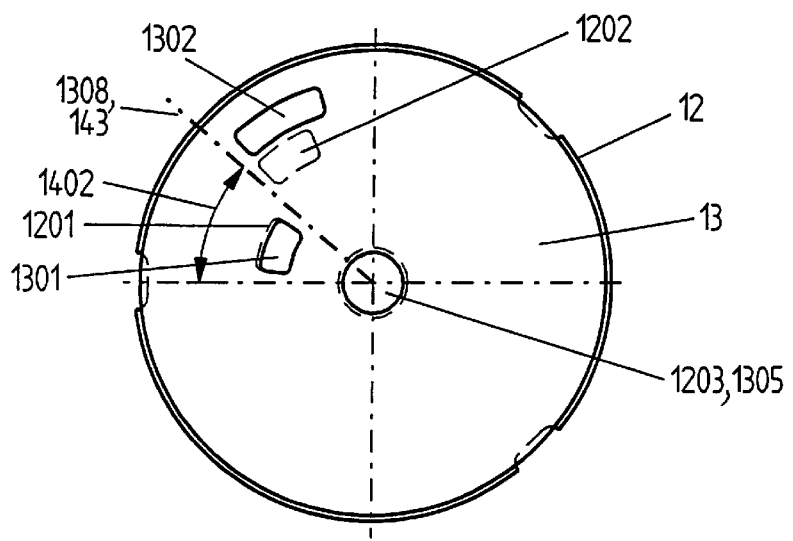
FIG. 7 shows the valve disks in the maximum cold-flow position.
Figure 9:
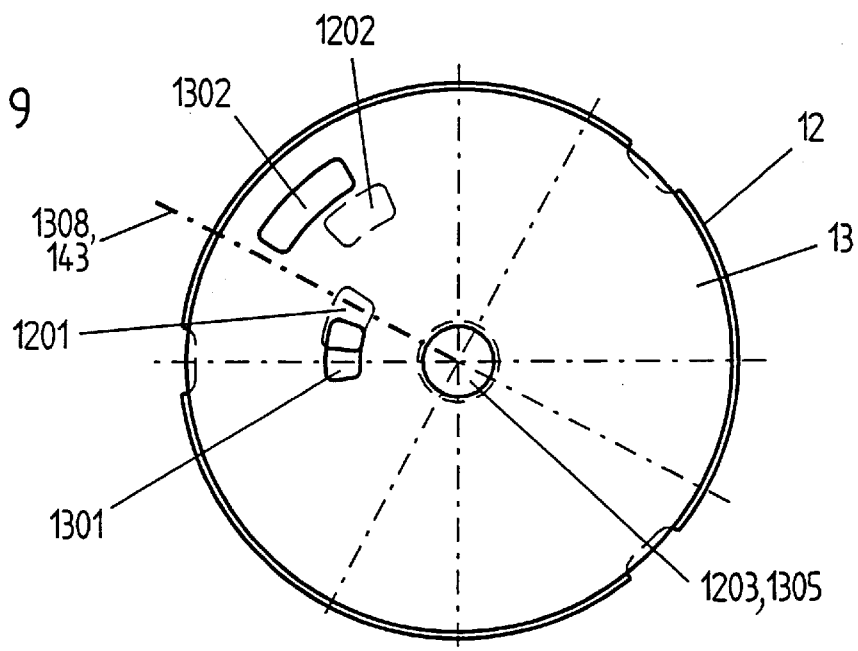
FIG. 9 shows the valve disks in a partial cold-flow position.

FIG. 6 shows the valve in the no-flow position with the ports 1201 and 1202 offset from the ports 1301 and 1302. In this position the handle 142 is normally angled to the left. Pivoting of the handle 142 (normally toward the right or clockwise as shown in FIG. 2) through the 45° arc 1402 will bring the port 1201 into direct alignment with the port 1302 as shown in FIG. 7 and cold water will flow at maximum volume through the ports 1201 and 1302 and into the cavity 132 and thence back down through the ports 1303 and 1305 to the hose 25 and out the head 27. The volume of cold-water flow can be varied by the angular position of the handle 142 which controls the angular overlap of the ports 1201 and 1301 as shown in FIG. 9.

Figure 8:
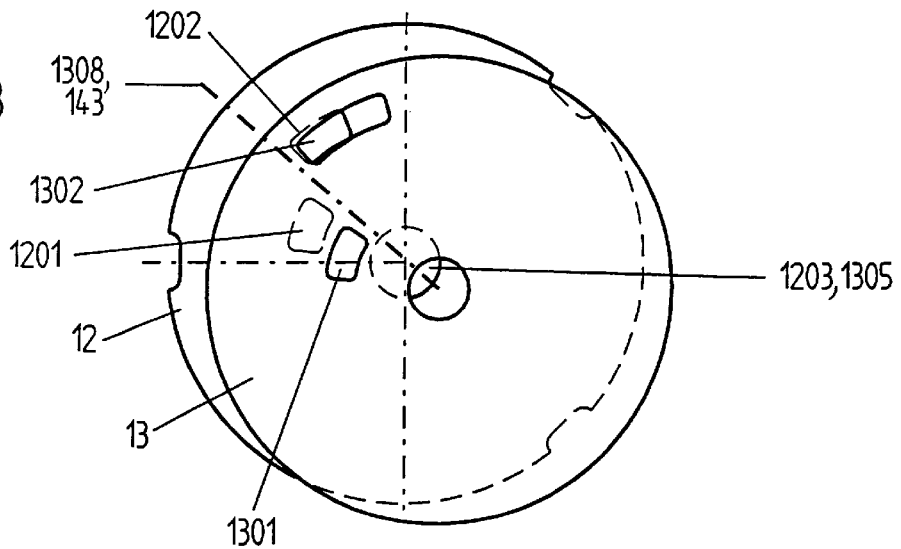
FIG. 8 shows the valve disks in the maximum hot-flow position.
Figure 10:
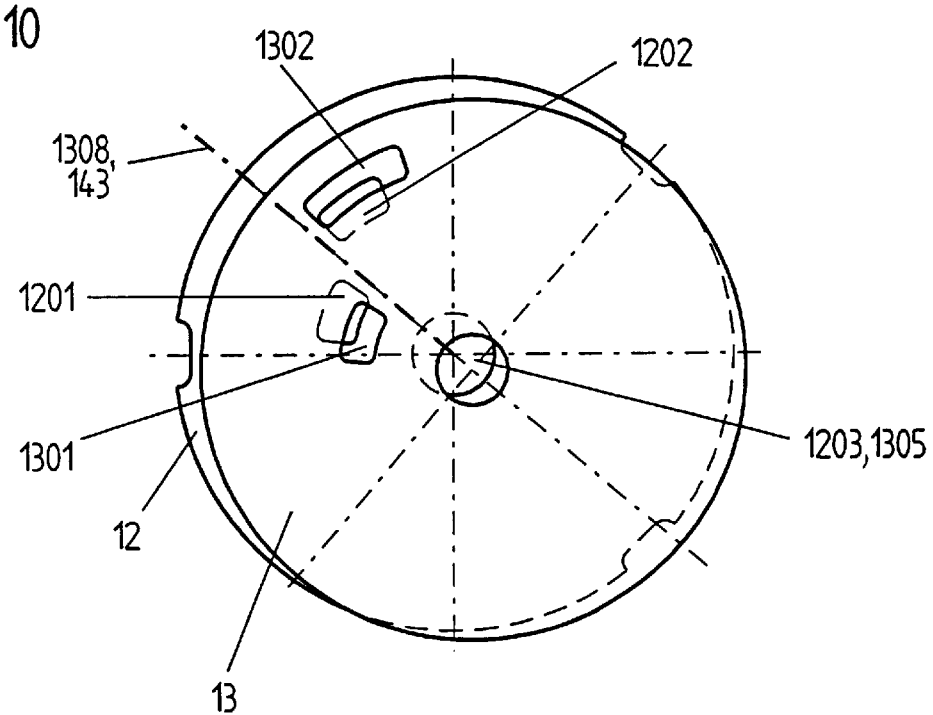
FIG. 10 shows the valve disks in a partial mixed-flow position.
Figure 11:
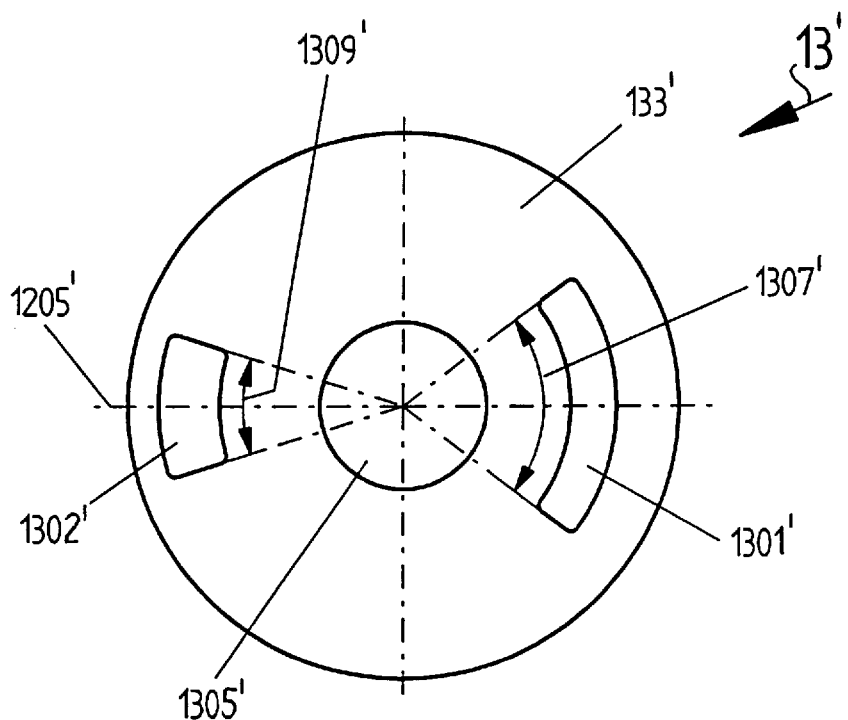
FIGS. 11 and 12 are detail views of further disks according to the invention.
Figure 12:
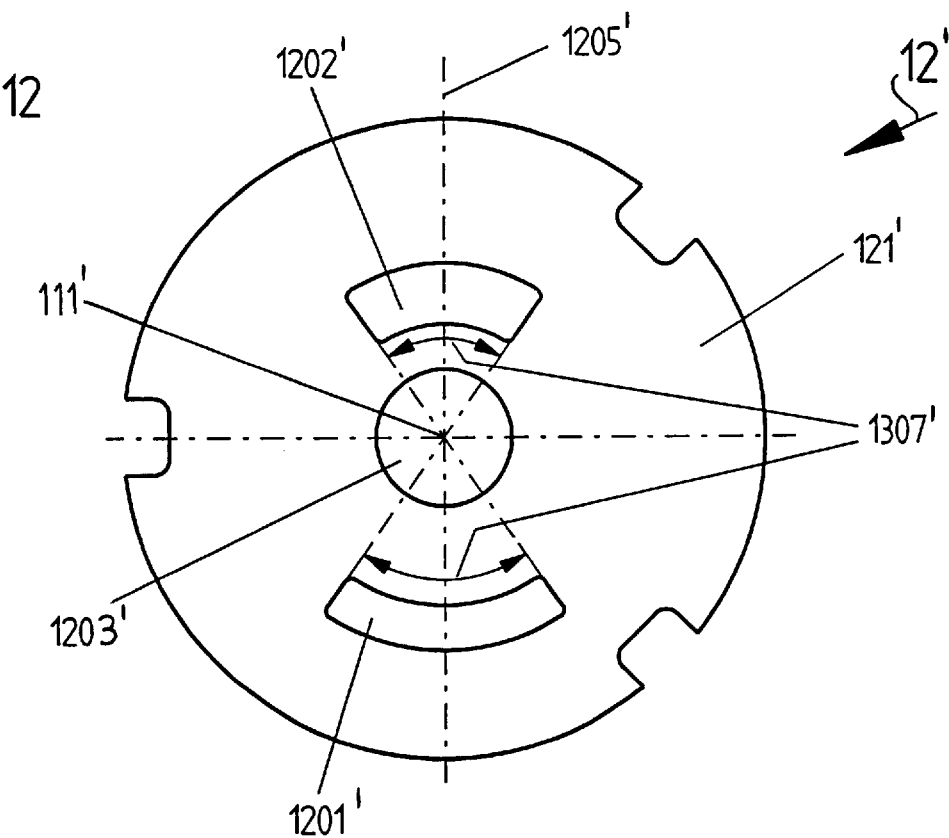

FIG. 8 shows how if, starting from the position of FIG. 7, the handle 142 is pushed all the way in, to slide the plate 13 on the plate 12, the port 1301 moves off the port 1201, thereby cutting off cold-water flow, and the port 1302 aligns with the port 1202, for purely hot-water flow. The overall flow cross-section will, however, remain the same so the volume rate of flow will not change; the temperature of the flow will be all that changes. In intermediate positions as shown in FIG. 10, the ports 1301 and 1302 both partially overlap the respective ports 1201 and 1202.

Thus with this system side-to-side rocking of the handle 142 about the axis 111 will solely control volume of flow, regardless of whether the flow is of hot, cold, or mixed hot/cold water. Similarly pivoting the handle 142 about the axis 1401 will solely affect the mix rate, from full-cold at one end through mixed to full-hot at the opposite end of this displacement.

FIGS. 11 through 16 show an alternate system where structure that is functionally identical to that of the system of FIGS. 1 to 10 is assigned the same reference numerals with added primes. Here the cold- and hot-water input ports 1201' and 1202' of the disk 12' are offset 180° to each other on a diameter 1205' but at different spacings from the axis 111'. Both the ports 1201' and 1202' extend over identical 60° arcs 1307' on opposite sides of the respective output port 1204'. Similarly the cold- and hot-water input ports 1301' and 1302' of the disk 13' are offset 180° to each other on a diameter 1305' but are differently spaced from the center of the disk 13'. The port 1301' extends over a 60° arc 1307 but the port 1302' extends over a 30° arc 1309'. In both cases the inner ports 1201' and 1301', as in FIGS. 1 to 10, are of smaller radial dimension than the respective outer ports 1202' and 1302' so that they have the same flow cross section as the respective outer ports 1202' and 1302'.

Figure 13:
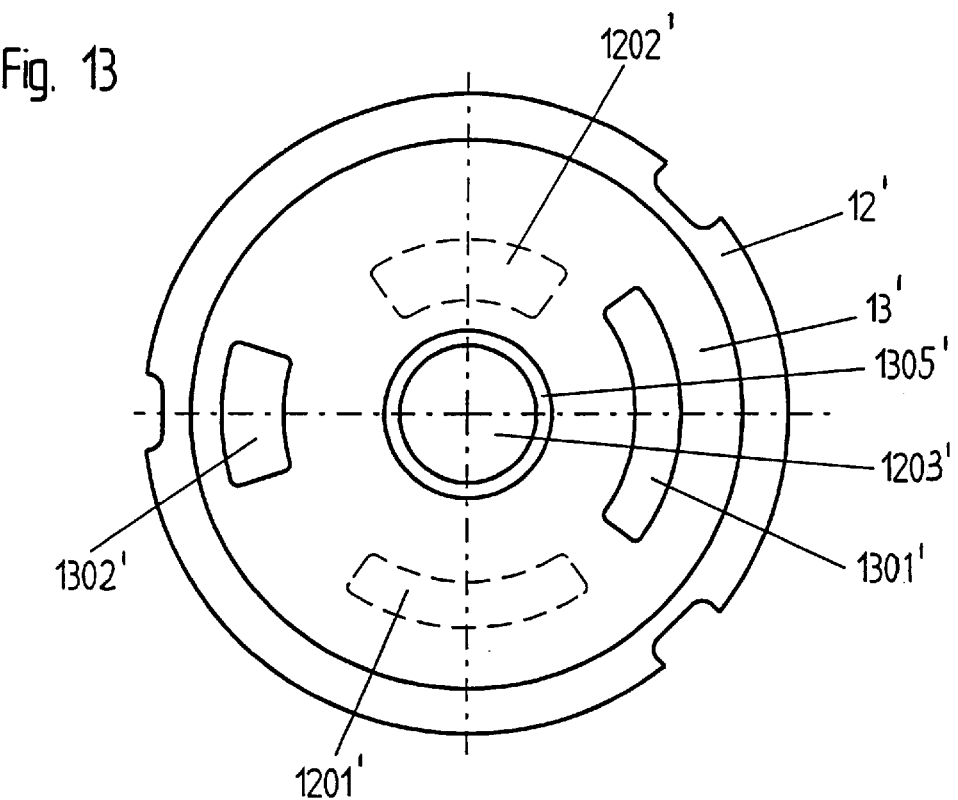
FIG. 13 shows the disks of FIGS. 11 and 12 in the no-flow position.
Figure 14:
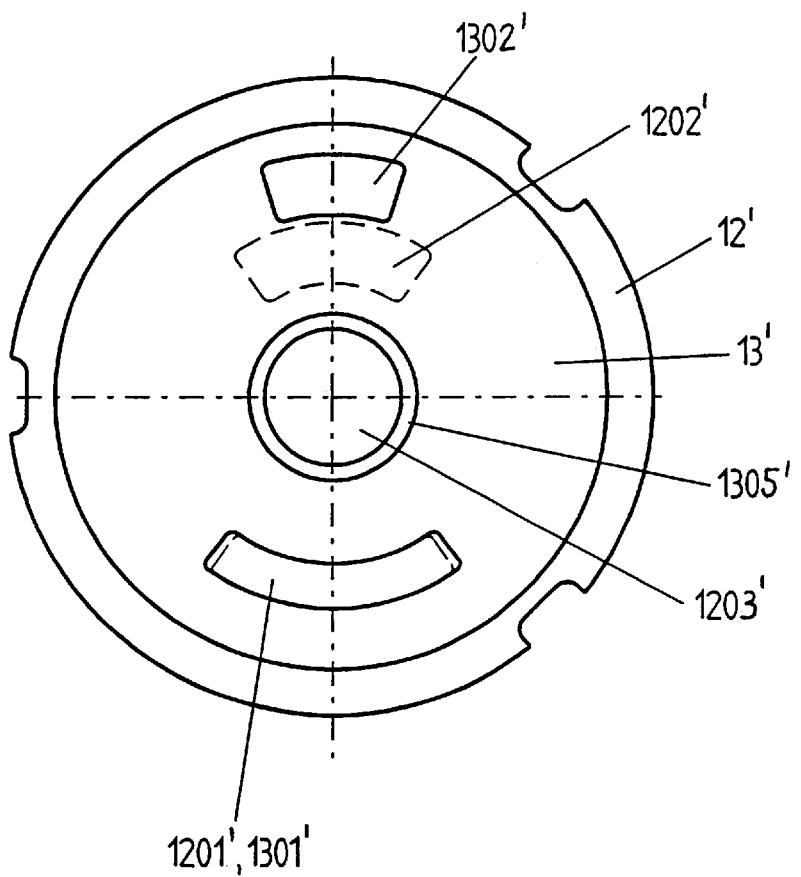
FIG. 14 shows the disks of FIGS. 11 and 12 in the maximum cold-flow position.
Figure 15:
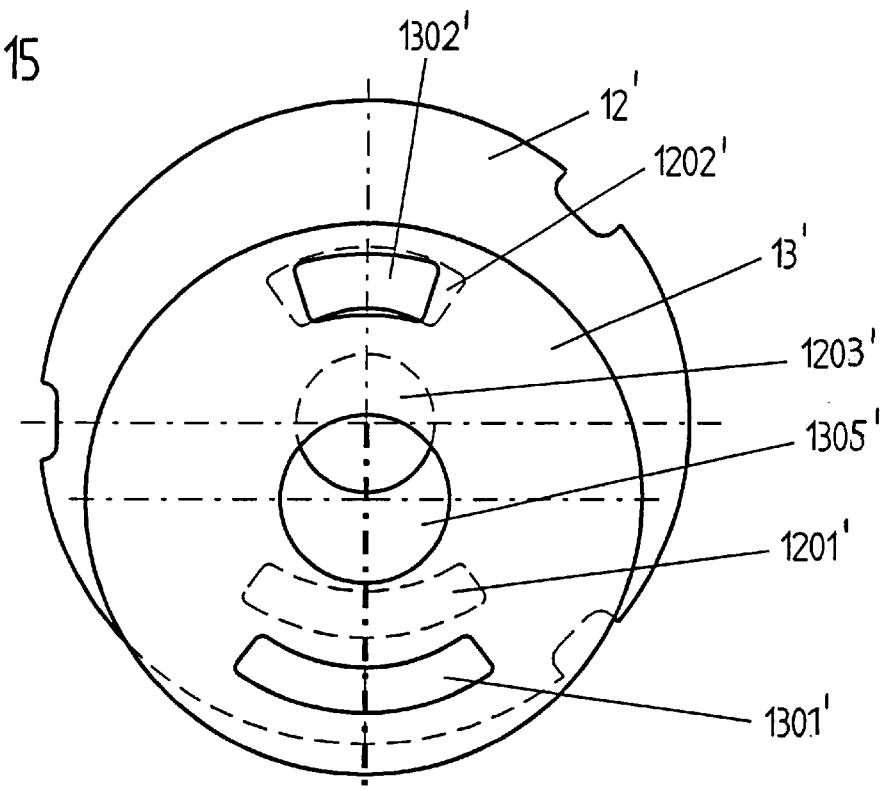
FIG. 15 shows the disks of FIGS. 11 and 12 in the maximum hot-flow position.
Figure 16:
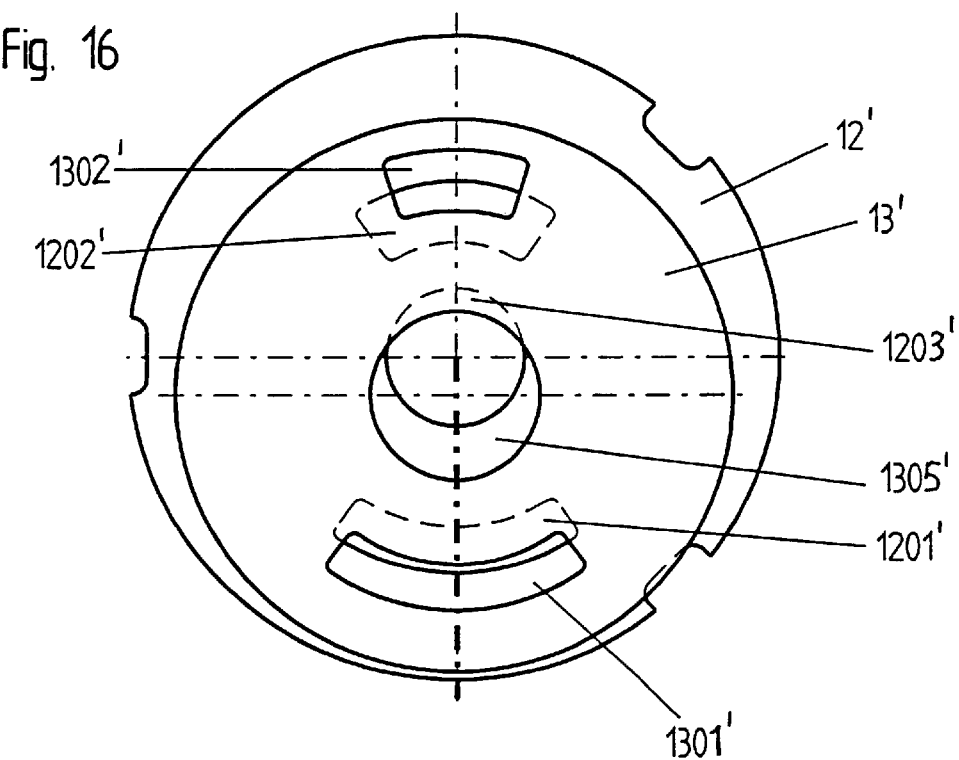
FIG. 16 shows the disks of FIGS. 11 and 12 in a partial mixed-flow position.

In a starting position as shown in FIG. 13 with the handle 142 tipped out and all the way to the left, the ports 1201' and 1202' are blocked and there is no flow. Clockwise rotation of the handle 142 about the axis 111' will bring the ports 1201' and 1301' into alignment for cold-water flow as shown in FIG. 14, with no flow from the port 1202'. Rocking the handle 142 back in this full-flow cold-water position will shift the valve through the full-flow mixed-water position of FIG. 16 to the full-flow hot-water position of FIG. 15. In any of the positions of FIGS. 14 to 16, pivoting of the disk 13' about the axis 111' will vary the volume of flow without changing temperature. Here the angular travel between no flow and full flow is 90°, twice that of the system of FIGS. 1 to 10.

With both systems it is possible to configure the end plate 12 so that the valve cartridge can be installed in a standard valve, switching it from one style of operation to another.

Here the flow from the mixed-valve ports 1301, 1302; 1301', 1302' is united in the cavity 132 and then sent back out through the outlet ports 1203, 1305; 1203', 1305'. Instead of this flow, the flow from the mixed-valve ports 1301, 1302; 1301', 1302' could go directly out of the valve or could move in separate passages or conduits to a further location where they are combined.

We claim:

1. A mixing valve comprising:
   a housing;
   a fixed valve plate in the housing having a flat outer surface generally centered on and perpendicular to a main axis and formed offset from the main axis with a pair of angularly offset and axially throughgoing inlet ports;
   a movable valve plate in the housing having an inner surface flatly engaging the outer surface of the fixed valve plate and an opposite outer surface, the movable valve plate being formed with a pair of angularly offset and axially throughgoing inlet ports alignable with the fixed-plate inlet ports, the ports of one of the pairs of inlet ports being at different radial spacings from a center of the respective plate; and
   actuating means including a lever displaceable in the housing about the main axis and about a transverse axis crossing the main axis for shifting the movable plate between
      a closed position with both of the movable-plate inlet ports out of alignment with the fixed-plate inlet ports and blocked by the fixed-plate outer face,
      one end position with one of the movable-plate inlet ports aligned with one of the fixed-plate inlet ports and the other of the movable-plate inlet ports out of alignment with the other of the fixed-plate inlet ports,
      another end position with the other movable-plate inlet port aligned with the other fixed-plate inlet port and the one movable-plate inlet port out of alignment with the one fixed-plate inlet ports, and
      an intermediate position with each of the movable-plate inlet ports partially overlapping the respective fixed-plate inlet port.

2. The mixing valve defined in claim 1, further comprising structure forming at the movable-plate outer surface a fluid-flow passage into which open the movable-plate inlet ports.

3. The mixing valve defined in claim 2 wherein the plates are each formed with an outlet port so positioned that they overlap in the end and intermediate positions of the plates.

4. The mixing valve defined in claim 3 wherein the outlet ports are at centers of the plates.

5. The mixing valve defined in claim 4 wherein the outlet ports are of circular shape.

6. The mixing valve defined in claim 4 wherein the movable-plate outlet port is of a flow cross section equal to between 50% and 100% of the flow cross section of the fixed-plate outlet port.

7. The mixing valve defined in claim 6 wherein the movable-plate outlet-port flow cross section is equal to about 80% of the fixed-plate outlet-port flow cross section.

8. The mixing valve defined in claim 1 wherein the ports are formed as cylindrical-annulus segments.

9. The mixing valve defined in claim 1 wherein the ports of each plate lie within a quadrant of the respective plate.

10. The mixing valve defined in claim 1 wherein the ports of each plate are at substantially different radial spacings from centers of the respective plates.

11. The mixing valve defined in claim 10 wherein the radial spacing of the ports of one of the plates is substantially greater than the radial spacing of the other of the plates.

12. The mixing valve defined in claim 10 wherein the ports of the one plate are spaced radially from each other by a distance equal to at least twice a radial dimension of one of the ports of the one plate and the ports of the other plate are spaced radially from each other by a distance equal to at least a radial dimension of one of the ports of the other plate.

13. The mixing valve defined in claim 10 wherein the ports of each plate have, measured from a center of the respective plate, an angular dimension of at most 20°.

14. The mixing valve defined in claim 1 wherein the ports of the other pair are at both at a same radial spacing from a center of the respective plate.

15. The mixing valve defined in claim 14 wherein the ports of the other pair both have, measured from a center of the respective plate, an angular dimension of about 60°.

16. The mixing valve defined in claim 15 wherein one of the ports of the one pair has, measured from a center of the respective plate, an angular dimension of about 60° and the other of the ports of the one pair has an angular dimension of about 30°.

17. The mixing valve defined in claim 15 wherein the ports of the each pair are diametrally opposite each other.

18. The mixing valve defined in claim 1 wherein all of the ports have substantially the same flow cross section.

19. The mixing valve defined in claim 1, further comprising
   means for supplying water under pressure to the fixed-valve inlet ports and for withdrawing water from the movable-valve inlet ports at the movable-valve outer face.

* * * * *